United States Patent [19]

Patton

[11] Patent Number: 5,029,117

[45] Date of Patent: Jul. 2, 1991

[54] METHOD AND APPARATUS FOR ACTIVE PYROMETRY

[75] Inventor: Evan E. Patton, Portland, Oreg.

[73] Assignee: Tektronix, Inc., Beaverton, Oreg.

[21] Appl. No.: 342,005

[22] Filed: Apr. 24, 1989

[51] Int. Cl.$^5$ .............................................. G01J 5/00
[52] U.S. Cl. ................................. 364/557; 374/126; 356/43
[58] Field of Search .................... 364/557; 374/9, 126, 374/127, 128, 121, 129, 130; 250/338; 356/43, 45

[56] References Cited

U.S. PATENT DOCUMENTS

| | | | |
|---|---|---|---|
| 3,745,830 | 7/1973 | Smith, Jr. ................................ | 356/43 |
| 3,796,099 | 3/1974 | Shimotsuma ....................... | 374/9 X |
| 4,222,663 | 9/1980 | Gebhart et al. ......................... | 356/45 |
| 4,313,344 | 2/1982 | Brogardh et al. .................... | 374/126 |
| 4,403,251 | 9/1983 | Domarenok et al. ........... | 364/557 X |
| 4,417,822 | 11/1983 | Stein et al. ........................... | 374/129 |
| 4,611,930 | 9/1986 | Stein ................................... | 374/126 |
| 4,647,774 | 3/1987 | Brisk et al. ....................... | 250/338.1 |
| 4,708,493 | 11/1987 | Stein ................................... | 374/128 |
| 4,799,788 | 1/1989 | Berthet et al. ......................... | 356/45 |
| 4,823,291 | 4/1989 | Berman ....................... | 250/338.1 X |
| 4,845,647 | 7/1989 | Dils et al. ............................. | 364/557 |
| 4,907,895 | 3/1990 | Everest ............................... | 374/130 |
| 4,919,542 | 4/1990 | Nulman et al. ................. | 374/126 X |

FOREIGN PATENT DOCUMENTS

| | | | |
|---|---|---|---|
| 2572523 | 5/1986 | France ................................. | 356/43 |
| 0131430 | 7/1985 | Japan ................................. | 374/121 |
| 0130834 | 6/1986 | Japan ................................. | 374/133 |
| 0050627 | 3/1987 | Japan ................................. | 374/121 |

OTHER PUBLICATIONS

Taylor, J. H., "Plank's Radiation Law", *Optic News*, Feb. 1987, pp. 26-27.
(Alexander Stein), "Laser Pyrometry", Apr. 30–May 1, 1987, pp. 279-290 of *NASA Conference Publication* 2503.
(Mark C. Lee & James L. Allen), "Noncontact True Temperature Measurement II", Apr. 30–May 1, 1987, pp. 291-304 of *NASA Conference Publication* 2503.
(J. L. Gardner & T. P. Jones), "Multiwavelength Radiation Pyrometry Where Reflectance is Measured to Estimate Emissivity", 1980, pp. 306-310.
(Fred E. Nicodemus), "Directional Reflectance and Emissivity of an Opaque Surface", Jul., 1965, pp. 667-773 of *Applied Optics*, vol. 4, No. 7.

*Primary Examiner*—Joseph L. Dixon
*Attorney, Agent, or Firm*—John Smith-Hill; Francis I. Gray

[57] ABSTRACT

The present invention constitutes a pyrometer device and an associated method of operation for measuring temperature based on the radiation emitted by a heated body in which increased accuracy is achieved by actively ascertaining the emittance of the body whose temperature is being measured. The pyrometer device includes a light source for intermittently illuminating the heated body and a radiation sensing mechanism for measuring the amount of light reflected and radiated by the body. The pyrometer device further includes a signal processing unit for processing the information developed by the radiation sensing mechanism and deriving the temperature of the body based on a calculated emittance factor and the amount of light radiated by the body.

23 Claims, 1 Drawing Sheet

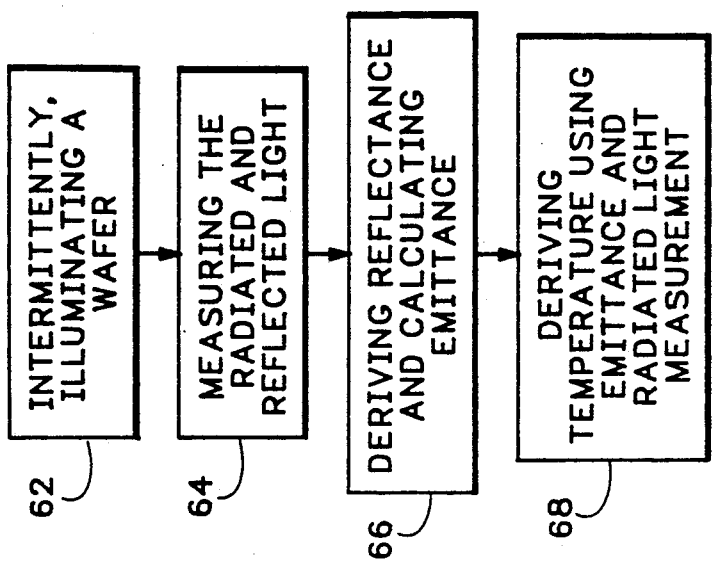
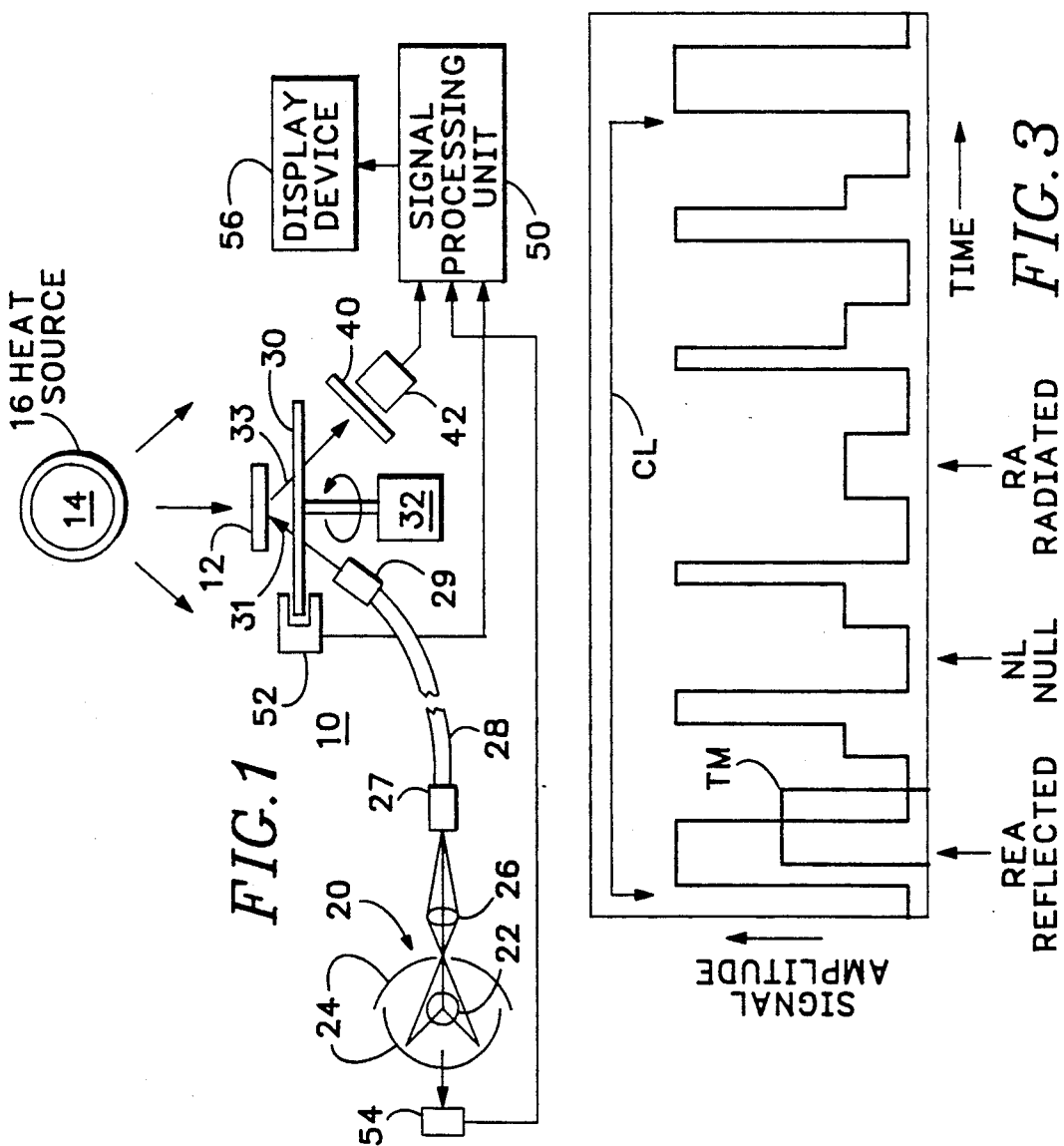

METHOD AND APPARATUS FOR ACTIVE PYROMETRY

The present invention relates to temperature measurement techniques and more specifically to pyrometry systems for measuring temperature based on the radiant energy emitted by a target body.

BACKGROUND OF THE INVENTION

The amount of radiant energy emitted by a heated body is known to be proportional to the temperature of the body and may be calculated using the Stefan-Boltzmann Law and/or Planck's radiation formula. Conversely, the temperature of a heated body may be calculated by measuring the amount of radiation emitted by that body and relating the amount of radiation so measured to the temperature through the use of the radiation formula. Most conventional pyrometers have utilized this principle of operation. However, the accuracy of these devices has been limited because they have employed estimated emittance factors in their radiation formula calculations.

The use of estimated emittance factors has not generally been a problem since most applications for pyrometers do not require a high degree of accuracy. However, in some fabrication processes for semiconductor wafers, the diffusion characteristics of the dopants used are highly temperature dependent and therefore in order to control the diffusion of such dopants into the thin layers of materials which make up these wafers, a precise knowledge of the temperature of the semiconductor materials is required. In such processes, it is desirable to be able to measure the temperatures of the materials within + or −5° C. in order to properly control diffusion effects. This level of accuracy is considerably beyond the capabilities of most conventional pyrometers.

Furthermore, the use of pyrometry techniques in the measurement of semiconductor wafer temperatures is complicated by the fact that the environment surrounding these wafers is frequently flooded with light from the radiative elements employed in heating and maintaining the temperature of the wafers during processing. Additionally, the measurement of wafer temperatures is rendered yet more difficult by the substantial variations in the emittance factors of such wafers due to interference effects arising from interactions between the emissions from the various layers of the wafers themselves. Many conventional pyrometers cannot be used in this environment because their readings would be seriously contaminated by stray radiation and would be significantly affected by errors in the estimated emittance factors they employ.

It is, therefore, an object of the present invention to provide a method and apparatus for pyrometry which provide more accurate temperature readings than previously used techniques.

It is another object of the present invention to provide a method and apparatus for pyrometry in which the emittance factor associated with the body whose temperature is being measured is accurately derived.

It is a further object of the present invention to provide a method and apparatus for pyrometry which is especially adapted for precisely measuring the temperatures of semiconductor materials during wafer fabrication processes and avoids the contamination problems associated with the radiation present in the fabrication environment.

SUMMARY OF THE INVENTION

The present invention constitutes a pyrometer device and an associated method of operation for measuring temperature based on the radiation emitted by a heated body in which increased accuracy is achieved by actively ascertaining the emittance of the body whose temperature is being measured. The pyrometer device includes a light source for illuminating the heated body on an intermittent basis and a radiation sensing mechanism such as a photodiode for separately measuring the combined amount of light reflected and radiated by the heated body and the amount of light radiated by the heated body. The pyrometer device further includes a signal processing unit such as a microprocessor system for processing the information developed by the radiation sensing mechanism and deriving the emittance of the heated body and the temperature of the body.

In operation, the light source intermittently illuminates the heated body whose temperature is desired to be measured while the radiation sensing mechanism separately measures the amount of light reflected and radiated by the heated body when it is illuminated by the source and the amount of light radiated by the body when it is not so illuminated. The signal processing unit then calculates the reflectance of the heated body and its corresponding emittance. The signal processing unit derives the temperature of the heated body in accordance with the Stefan-Boltzmann Law and Planck's radiation formula based on the amount of light radiated by the body and the emittance previously calculated.

In the preferred embodiment, the pyrometer device is adapted for measuring the temperatures of semiconductor wafers during fabrication processes. An infrared light source is used to provide the light for illuminating the heated body and a fiber optic cable is used for conducting the light from the infrared source to the heated body. A bandpass filter is employed in combination with the radiation sensing mechanism to limit the radiation measured to infrared light within a band centered between 5.0 and 0.8 microns in wavelength. The fiber optic cable allows the light from the source to be concentrated on the semiconductor wafer being processed while the bandpass filter helps to reduce contamination of the light measurements by stray light from other sources present during wafer fabrication.

BRIEF DESCRIPTION OF THE DRAWINGS

For a better understanding of the invention, and to show how the same may be carried into effect, reference will now be made, by way of example, to the accompanying drawings in which:

FIG. 1 is a diagrammatic view of a pyrometry apparatus for measuring temperature in accordance with the principles of the present invention, FIG. 2 is a flow chart of the fundamental steps involved in the method of operation of the present invention, and FIG. 3 is a diagram for the signal produced by the radiation sensing mechanism of the present invention illustrating the timing of the various components of the signal.

DESCRIPTION OF THE PREFERRED EMBODIMENT

Referring now to FIG. 1, a system 10 in accordance with the present invention is shown as configured for measuring the temperature of a semiconductor wafer 12 which is in the process of being fabricated and is being heated by radiation from an argon arc lamp 14. The argon lamp 14 would typically operate at 3200 K at a power level of 150 kilowatts thereby flooding the wafer 12 with radiant energy and providing the required heating for the fabrication process. It should be noted that the lamp 14 is surrounded by a water jacket 16 which is operative for cooling the lamp but also affects the wavelengths of radiation emitted by the lamp. In particular, the water within the jacket 16 substantially reduces the amount of radiation produced by the lamp 14 within an absorption band roughly extending between 1.4 and 1.5 microns in wavelength and 1.9 and 5.0 microns in wavelength.

The present invention comprises a light source 20 in which a quartz halogen bulb 22 provides light radiation which is directed by the reflectors 24 toward the lens 26 which focuses the radiation into the proximal end 27 of the fiber optic cable 28. The light source 20 is adapted for providing substantial amounts of infrared radiation useful in accordance with the principles of operation of the present invention as will be later explained. The fiber optic cable 28 comprises a bundle of fiber optic elements which conduct the light radiation from the source 20 to a position below the rotating disk 30 from which it is directed toward the semiconductor wafer 12 from the distal end 29 of the cable 28.

The disk 30 is rotated by a motor 32 and includes two groups of slot-like apertures which are positioned on the disk 30 so as to form an inner set and an outer set of apertures located at different radial distances from a center of the disk 30. The apertures are circumferentially spaced so that all adjacent apertures within each of these sets are equidistant from one another. The apertures allow light signals directed toward their radial locations on the disk 30 to be modulated in accordance with the rate of rotation of the disk as the light from these signals is alternately blocked by the material of the disk 30 and passed through the apertures in the disk 30. Light from the fiber optic cable 28 is directed upwardly through the inner set of apertures toward the semiconductor wafer 12 as indicated by the arrow 31, while light reflected and radiated by the wafer 12 is transmitted downwardly through the outer set of apertures toward the filter 40 as indicated by the arrow 33. Each of the light signals passing through the disk 30 is modulated in accordance with the rate of rotation of the disk, however, since the inner set of apertures contains five slot-like elements and the outer set of apertures contains six slot-like elements, these signals are modulated at different frequencies thereby enabling the signal information to be time multiplexed on a single optical channel. It should be noted that the inner and outer sets of apertures may contain more or less than five and six elements while still allowing the light signals to be appropriately modulated although different signal patterns would result.

The filter 40 comprises an optical bandpass filter adapted for passing only infrared light within the water absorption band of the lamp 14 so as to avoid substantial contamination of the light being measured by light from the lamp 14. The filter 40 should have a narrow bandwidth of approximately 10 nanometers and should preferably pass light centered either at 1.46 microns in wavelength or at 1.90 microns in wavelength corresponding to peaks in the water absorption band of the lamp 14. The light from the semiconductor wafer 12 which passes through the filter 40 is received by a photodiode 42 suitable for sensing infrared light such as a germanium photodiode which then transmits a signal proportional to the amount of light it receives to the signal processing unit 50.

A timing unit 52 is positioned along the periphery of the disk 30 and includes a small light source and an associated photodetector located on opposite sides of the disk 30 for detecting the passage of a notch located along the outer edge of the disk 30. The timing unit 52 furnishes a timing signal indicative of the angular position and rate of rotation of the disk 30 which is supplied to the signal processing unit 50 for use in interpreting the signals provided by the photodiode 42. Another photodetector 54 is located adjacent to the light source 20 and is positioned for receiving a fixed percentage of the light generated by the source 20. The detector 54 furnishes a signal to the signal processing unit 50 indicative of the performance and the amount of light generated by the source 20.

The signal processing unit 50 includes an A/D converter which processes the signal information from the photodiode 42, the timing unit 52 and the photodetector 54 in order to convert this information into digital format and includes a microprocessor system for processing this information to derive an emittance signal and ultimately a temperature signal which is furnished to a digital display device 56 for display to the user.

Referring now to FIG. 2, the operation of the present invention may be viewed as including four fundamental steps. In step 62, the light source 20, fiber optic cable 28 and rotating disk 30 cooperate in intermittently illuminating the semiconductor wafer 12 with infrared light. In step 64, selected amounts of the light which is reflected and radiated light from the wafer 12, and is within the band passed by the filter 40, is measured by the photodiode 42. The radiated and the reflected light signals are separately modulated in accordance with the rotation of the disk 30 and more specifically are modulated at different frequencies since the inner and outer sets of apertures contain different numbers of elements.

As shown in FIG. 3, three distinct signal levels are generated and measured by the photodiode 42 as the result of this pattern of modulation. As the signals "beat" with one another, a signal level REA corresponding to a combination of reflected and radiated light, a signal level RA corresponding solely to radiated light and a null signal level NL corresponding to background radiation are produced during the course of each cycle CL in the rotation of the disk 30. These different radiation signals may be accurately located and sampled by the signal processing unit 50 in accordance with the timing signal TM provided by the timing unit 52 and signal processing operations are thereby facilitated. The signal processing unit 50 conveniently obtains three separate signal levels, the level REA indicating the amount of combined reflected and radiated light, the level RA indicating the amount of radiated light and the level NL indicating the amount of background radiation included with the foregoing signals. In step 66, the processing unit 50 subtracts the signal levels RA and NL from the signal level REA in order to derive the amount of light reflected by the wafer 12. This amount is then compared to a reference level REF for a target body approaching 100% reflectivity, which has been adjusted in accordance with the performance of the source 20 as indicated by the photodetector 54 in order to provide an accurate measure of the reflectivity of the wafer 12. This reflectivity figure is then subtracted from 1.00 in order to calculate the emittance of the wafer 12.

In accordance with step 68, the processing unit 50 then subtracts the level of the null signal level NL from the level RA of the radiant energy signal in order to obtain a figure indicative of the amount of energy radiated by the wafer 12. This figure is then divided by the emittance previously calculated and further by a calibration constant C for the system 10 in order to generate a signal level corresponding to the fourth power of the temperature of the semiconductor wafer 12. The fourth root is then taken of this signal level in order to generate a signal value relating to the temperature of the wafer 12. The foregoing operations generate a signal value correlating with the temperature of the wafer 12 in accordance with the Stefan-Boltzmann Law as follows:

$$T = \left[ \frac{RA - NL}{C \times \left(1 - \frac{REA - RA - NL}{REF}\right)} \right]^{\frac{1}{4}}$$

where:
T = Absolute temperature in °K.
RA = Radiated energy level
NL = Background energy level
C = System calibration constant
REA = Radiated and reflected energy level
REF = Reflectivity reference level This signal level is then referenced to a lookup table which adjusts its value to correct for changes in the spectral distribution of the radiated light with temperature in accordance with Planck's Radiation formula and more specifically shifts in the percentage of total radiated energy emitted over the band defined by the filter 40 in order to derive a signal corresponding directly to temperature. The value of the temperature of the target body indicated by this signal level is then displayed as a temperature reading on a device 56. It should be understood that the microprocessor system of the signal processing unit 50 performs the foregoing operations through the manipulation of digital signals in accordance with system software providing the necessary instructions for the required operations. The end result of the operation of the present invention is an accurate temperature reading for the semiconductor wafer 12 derived through the use of a precise figure for the emittance of the semiconductor materials.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A method of temperature measurement for use in semiconductor wafer fabrication processes comprising the steps of:
    (a) intermittently illuminating at a first frequency a semiconductor wafer with light from a light source;
    (b) intermittently collecting at a second frequency light from the semiconductor wafer;
    (c) measuring the amount of light reflected by said wafer when it is illuminated by said source as a function of the intermittently collected light;
    (d) measuring the amount of light radiated by said wafer when it is not illuminated by said source as a function of the intermittently collected light;
    (e) deriving the emittance of said wafer from the values measured in steps (c) and (d); and
    (f) using said emittance in combination with the value measured in step (d) to derive the temperature of said wafer.

2. The method of claim 1 wherein steps (c) and (d) are performed within a band centered between 5.0 and 0.8 microns in wavelength.

3. The method of claim 1, wherein said step of illuminating said wafer includes conducting light from said source to said wafer using a fiber optic cable.

4. The method of claim 1 wherein steps (c) and (d) include filtering the light with a bandpass filter adapted for passing light centered at 1.46 microns in wavelength.

5. The method of claim 1 comprising providing a detector at a predetermined location relative to the wafer for collecting light received from the direction of the wafer, and wherein step (d) comprises the steps of (i) measuring the intensity of light received from said direction when the wafer is not illuminated by said source, (ii) measuring the intensity of light received from said direction when the light from the wafer is obscured from the detector, and (iii) subtracting the value measured in step (ii) from the value measured in step (i).

6. The method of claim 1 comprising providing a detector at a predetermined location relative to the wafer for collecting light received from the direction of the wafer, and wherein step (c) comprises the steps of (i) measuring the intensity of light received from said direction when the wafer is illuminated by said source, (ii) measuring the intensity of light received from said direction when the wafer is not illuminated by said source, and (iii) subtracting the value measured in step (ii) from the value measured in step (i).

7. The method of claim 1 wherein step (e) comprises deriving the reflectance of the wafer from the values measured in steps (c) and (d) and calculating the emittance of the wafer from the derived value of the reflectance.

8. The method of claim 7, comprising deriving the reflectance of the wafer by comparing the amount of light reflected by the wafer with the amount of light reflected by a body of known reflectance.

9. The method of claim 1 wherein step (d) comprises measuring the sum of the light radiated by the wafer plus background luminous flux, measuring the background luminous flux when light from the wafer is obscured, and subtracting the background luminous flux from the sum of the light radiated by the wafer plus background luminous flux.

10. A pyrometer for measuring temperature based on the radiation emitted by a heated body comprising:
    means for illuminating said heated body with light intermittently at a first frequency;
    means for collecting light from said heated body intermittently at a second frequency and measuring both the amount of light reflected by said heated body and the amount of light radiated by said heated body as a function of the collected light;

means for deriving the emittance of said heated body based on the amount of light reflected by said body; and means for deriving the temperature of said heated body based on said emittance and the amount of light radiated by said heated body.

11. The pyrometer of claim 10, wherein said means for illuminating said heated body includes;
an infrared light source, and
a fiber optic means for conducting light from said source to said heated body.

12. The method of claim 11 wherein step (c) comprises measuring the amount of light reflected and radiated from the wafer and subtracting the amount of light radiated by the wafer.

13. The pyrometer of claim 10, wherein said means for collecting light includes:
a bandpass filter for passing infrared light centered around 1.46 microns in wavelength, and
a germanium photodiode for sensing the amount of the light passed by said filter.

14. The pyrometer of claim 10, wherein said means for illuminating said heated body includes a halogen lamp.

15. In a pyrometer device for measuring semiconductor wafer temperature during fabrication processes based on the Stefan-Boltzmann and Planck's radiation formulae in accordance with the amount of light radiated by the wafer, the improvement comprising:
means for intermittently illuminating said wafer with infrared light at a first frequency;
means for collecting light from said wafer at a second frequency;
means for measuring the amount of said light that is reflected by said wafer in a band centered between 5.0 and 0.8 microns in wavelength when the wafer is illuminated as a function of the collected light and calculating the emittance of said wafer based on said measurement; and
means for deriving a temperature signal based on the calculated value of said emittance and on the amount of light collected when the wafer is not illuminated.

16. The device of claim 15, wherein said means for illuminating said wafer includes:
a halogen lamp, and
a fiber optic means for conducting light from said lamp to said body.

17. The device of claim 15, wherein said means for measuring reflected light includes:
a bandpass filter for passing infrared light centered around 1.46 microns in wavelength, and
a germanium photodiode for sensing the amount of light passed by said filter.

18. The device of claim 15, wherein said means for measuring reflected light includes:
a bandpass filter for passing infrared light centered around 1.90 microns in wavelength, and
a germanium photodiode for sensing the amount of light passed by said filter.

19. Improved apparatus for processing a semiconductor wafer comprising source means for flooding the wafer with radiant energy for heating the wafer, the source means including cooling means that attenuates energy within an infrared range of wavelengths, and wherein the improvement comprises a pyrometer device for measuring the temperature of the semiconductor wafer, the pyrometer device comprising:

means for intermittently illuminating the wafer with infrared light at a first frequency;
means for intermittently collecting light radiated and reflected by said wafer in a band centered between 5.0 and 0.8 microns in wavelength at a second frequency and for separately measuring the amount of light collected when the wafer is illuminated and the amount of light collected when the wafer is not illuminated; and
means for calculating the emittance of the wafer based on the amount of light collected when the wafer is illuminated and on the amount of light collected when the wafer is not illuminated and for deriving the temperature of the wafer based on the calculated value of the emittance and on the amount of light collected when the wafer is not illuminated.

20. Apparatus according to claim 19, wherein the flood means comprises an argon lamp and the cooling means comprises a water jacket that surrounds the lamp.

21. Apparatus according to claim 19, wherein the means for intermittently illuminating the wafer includes a halogen lamp and the means for collecting light radiated and reflected by the wafer includes a bandpass filter passing infrared light at a wavelength within said range of wavelengths attenuated by the cooling means.

22. An improved pyrometer of the type having means for intermittently illuminating a heated body with light, means for detecting light from the heated body within a predetermined band of wavelengths to generate an electrical signal, means for determining a temperature for the heated body from the electrical signal, and means for displaying the temperature, the improvement comprising means for intermittently collecting the light from the heated body so that the electrical signal represents first intervals when light from the heated body is obscured from the detecting means, second intervals when only light radiated from the heated body is passed by the detecting means, and third intervals when both radiated and reflected light from the heated body is passed by the detecting means, the determining means measuring from the first intervals a luminous flux value, from the second intervals a radiated flux value and from the third intervals a reflected plus radiated flux value and calculating from the luminous flux value, the radiated flux value and the reflected plus radiated flux value an emittance for the heated body and from the emittance and the radiated flux value a temperature for the heated body for display by the displaying means.

23. An improved pyrometer as recited in claim 22 wherein the intermittently illuminating and collecting means comprise:
a disk rotatably mounted between a light source of the illuminating means and the detecting means, the disk having an inner set of apertures and an outer set of apertures located at different radial distances from the center of rotation and circumferentially spaced so that all apertures within each set are equally spaced from each other, the number of apertures in the inner set being different from the number of apertures in the outer set, the light from the light source being guided through one set to illuminate the heated body, and the detecting means being situated to collect light from the heated body that passes through the other set; and
means for generating a timing signal for each rotation of the disk, the timing signal being used by the determining means to measure the respective flux values.

* * * * *